March 16, 1965
J. S. WRIGHT
3,173,412
INFRARED GAS HEATING
Filed Nov. 29, 1960
3 Sheets-Sheet 1
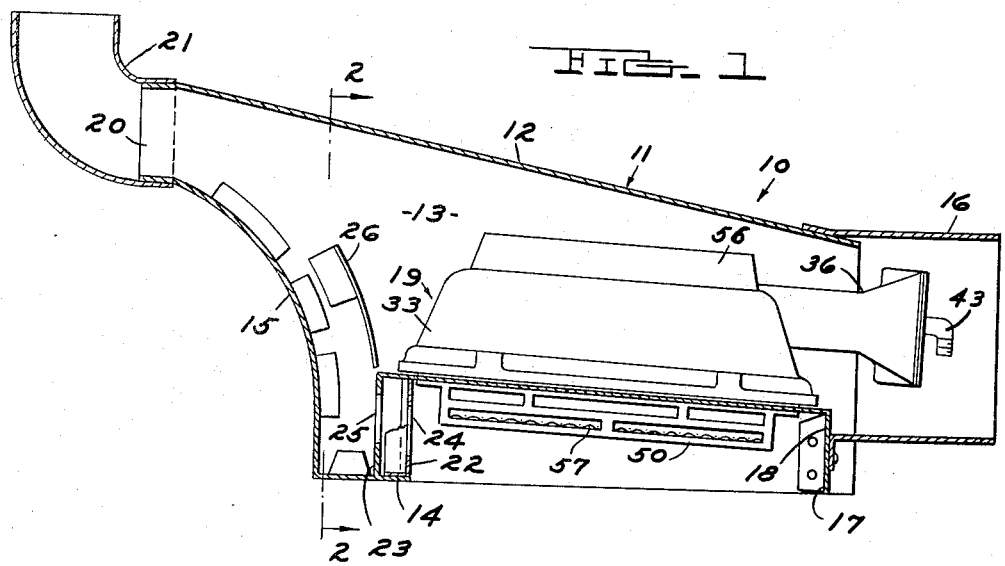
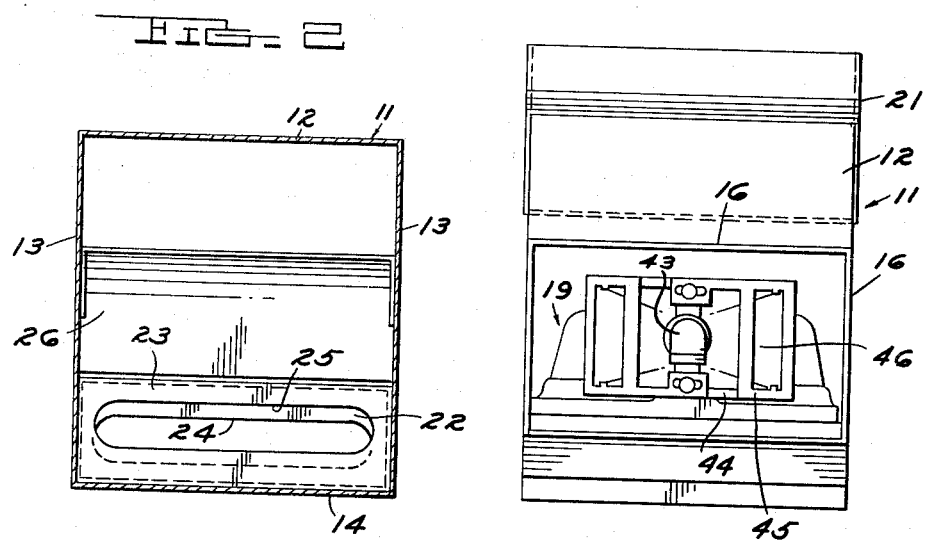
INVENTOR.
JOHN S. WRIGHT
BY
Barnes, Kisselle, Rauch & Choate
ATTORNEYS INVENTOR.
JOHN S. WRIGHT
BY
Barnes, Kisselle, Raisch & Choate
ATTORNEYS March 16, 1965  J. S. WRIGHT  3,173,412
INFRARED GAS HEATING
Filed Nov. 29, 1960  3 Sheets-Sheet 3
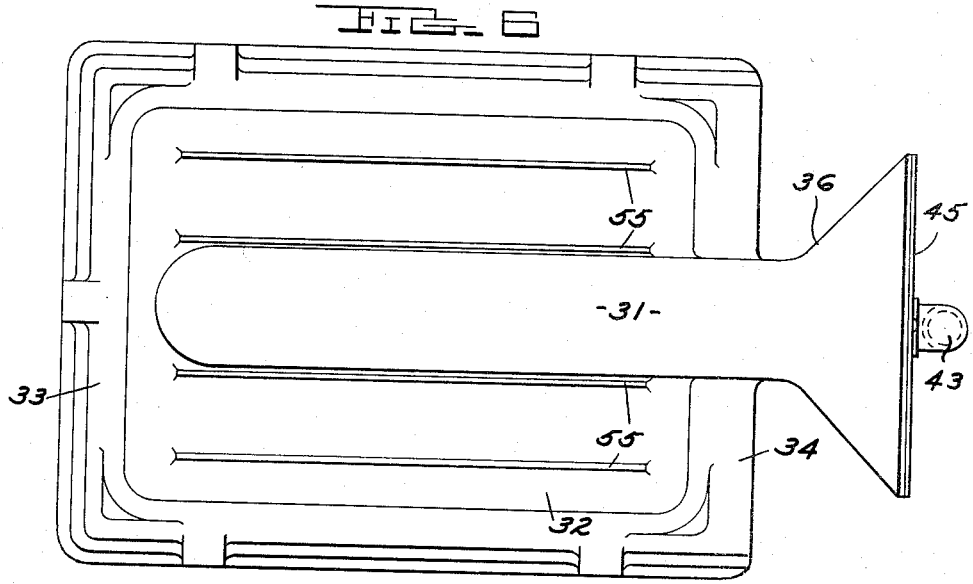
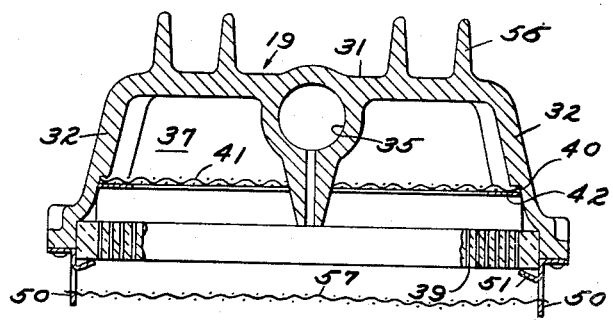
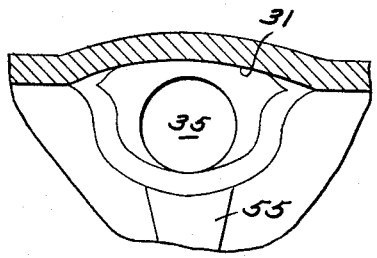
INVENTOR.
JOHN S. WRIGHT
BY
Barnes, Kisselle,
Raisch & Choate
ATTORNEYS

United States Patent Office 3,173,412
Patented Mar. 16, 1965

3,173,412
INFRARED GAS HEATING
John S. Wright, Carleton, Mich., assignor, by mesne assignments, to General Precision, Inc., Tarrytown, N.Y., a corporation of Delaware
Filed Nov. 29, 1960, Ser. No. 72,435
12 Claims. (Cl. 126—92)

This invention relates to heating by using combustible gases and particularly to producing infrared rays by burning combustible gases.

It is known in the art that when a mixture of combustible gases and air are caused to flow through a perforated ceramic plate and ignited on the outer surface of the plate, the gases in addition to producing heat by combustion also produce heat in the form of infrared rays. One of the major problems in such combustion is the tendency for the ceramic plate and the associated casing to heat up raising the temperature of the interior of the casing and causing the burner to backfire and burn within the interior of the casing on the opposite side of the ceramic plate. This causes a rapid deterioration of the plate. Another major problem is that the combustion gases tend to collect in the area of the ceramic plate and thereby adversely affect combustion. A further problem is that the proximity of the article being heated affects the temperature of the ceramic plate so that a combustion arrangement which is satisfactory for one type of heating is unsatisfactory for another type of heating.

It is an object of this invention to provide a method and apparatus for effectively burning a mixture of combustible gases and air to produce maximum heat and maximum radiant energy in the form of infrared rays.

It is a further object of the invention to provide such a method and apparatus which can be used in an enclosed area as contrasted to an outside area.

It is a further object of the invention to provide such a method and apparatus wherein the heating is not adversely affected by the presence of combustion gases.

It is a further object of the invention to provide such a method and apparatus wherein there is automatic compensation for the proximity of the article to the heat generating zone.

It is a further object of the invention to provide such a method and apparatus wherein the efficient combustion is achieved without any moving parts.

Basically, according to the invention, the products of combustion are caused to be drawn by a natural draft from the area of the burner means such as the ceramic plate in a manner to draw cool air into the inlet of the casing for combustion and across the outer surface of the casing of the burner to cool it. The temperature of the combustion gases determines the effectiveness of the draft that is created so that the amount of cool air that is moved across the casing and, in turn, drawn into the interior of the casing is directly related to the temperature of the combustion gases. The casing includes novel means for providing more uniform combustion of the gases and a better cooling of the casing.

In the drawings:

FIG. 1 is a part sectional elevation of an apparatus embodying the invention.

FIG. 2 is a sectional view taken along the line 2—2 in FIG. 1.

FIG. 3 is an end view of the apparatus shown in FIG. 1.

FIG. 6 is a top plan view of the portion of the apparatus shown in FIG. 4.

FIG. 7 is a sectional view taken along the line 7—7 in FIG. 5.

FIG. 8 is a fragmentary sectional view taken along the line 8—8 in FIG. 5.

Figure 4:
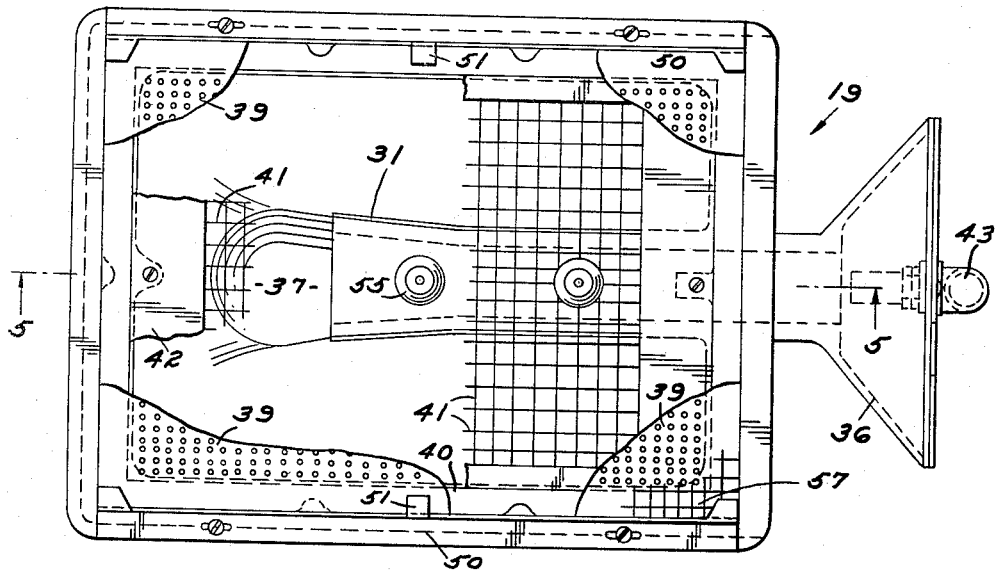
FIG. 4 is a bottom plan view of a portion of the apparatus shown in FIG. 1, parts being broken away.

Referring to FIG. 1, the apparatus 10 comprises a housing 11 that can be made of sheet metal and includes a top wall 12, side walls 13, a bottom wall 14 and an end wall 15. Housing 11 also includes a rectangular inlet 16 that has a width substantially equal to the distance between the side walls 13. Bottom wall 14 is provided with an opening 17 in which a rectangular support 18 is provided for a burner of rayhead 19. As shown, the rayhead 19 is positioned within the housing 11 in spaced relation to the top and bottom walls 12, 14.

The upper wall 12 is inclined upwardly from the inlet 16 and the end wall 15 is curved upwardly and outwardly to form an outlet 20. A curved conduit 21 extends from the outlet 20 to provide a vertical stack. Support 18 includes spaced vertical walls 22, 23 adjacent and spaced from end wall 15. Walls 22, 23 have vertically staggered openings 24, 25 therein through which the gases of combustion from adjacent the rayhead 19 pass and are directed upwardly toward the stack 21. Housing 12 includes a curved deflector 26 which is generally parallel to the end wall 15 and extends between the side walls 13 to guide the gases of combustion upwardly toward the stack 21. The movement of the gases toward the outlet 20 and stack 21 causes relatively cool air to be drawn through inlet 16 and across the exterior surface of the rayhead 19 to cool the rayhead. At the same time, cool air passes to the interior of the rayhead 19 where it is mixed with combustible gases and caused to burn on the surface of the rayhead as will be described.

Referring to FIGS. 4 through 8, inclusive, the rayhead 19 comprises a generally rectangular dish-shaped casing 30, preferably a casting of light-weight heat dissipating material such as gray iron. Casing 30 includes a substantially flat top wall 31 and inclined side walls 32 and end walls 33, 34. The housing 30 also includes an integral passage 35 that is formed in part by the top wall 31. Passage 35 communicates with an extension 36 exteriorly of the casing 30 which forms an inlet 36 that is flared and diverges outwardly. The passage 35 terminates within the chamber 37 of the casing 30 nearer the end wall 33 than the end wall 34. The inner edges of the side walls 32 and end walls 33, 34 are formed with projections 38 for supporting the burner element 39 which may be in the form of a flat uniformly thick perforated ceramic plate or the like wherein the perforations comprise at least 20 percent of the area of the plate. Such a plate is described in the patent to Schwank 2,775,294. One or more plates 39 may be positioned in parallel relation to bottom wall 31 to close the opening formed by the side walls 32 and end walls 33, 34, the plates being held in position in any suitable manner, for example, by a cement made of the ground material of the plates and water glass. Bosses 55 extending from the wall which forms passage 35 support plates 39 intermediate their edges. Passages 55a in bosses 55 vent passage 35 and tend to prevent vapor lock in the passage 35.

The casing 30 also includes a secondary shoulder 40 on side walls 32 and end walls 33, 34, intermediate the top wall and the burner elements 39 and in parallel spaced relation thereto, which supports a foraminous element 41 such as a screen. In addition, a flange or frame member 42 engages the screen and surrounds the interior of the chamber 37.

A nozzle 43 is supported within the inlet 36 by a suitable plate 44 (FIG. 3) having openings therein through which air can pass to the interior chamber 37 of the casing 30. Damper members 45 having openings therein are mounted adjacent the member 44 and are adapted to be moved relative thereto to restrict or enlarge the openings 46 and thereby control, in part, the air passing to the interior of the casing 30.

Top wall 31 of casing 30 is formed with integral longitudinally extending fins 56 which increase the surface area thereof and facilitate the cooling of the casing 30.

The pressure of combustible gases through the nozzle 43 aspirates air from the exterior through inlet 16 of housing 11 and into the converging inlet 36 of the casing 30. The mixture of air and gases passes thereafter through passage 35 to the chamber 37 of the casing 30. The screen 41 serves to distribute the gases throughout the chamber 37 and cause them to flow toward the burner elements 39 and thereafter pass through the burner elements 39 to the exterior thereof where they are burned. The flange member 42 serves to prevent the concentration of the gas and air mixture adjacent the periphery of the casing 30 and thereby further facilitates the even combustion of the gases on the surface of the burner elements 39.

Figure 5:
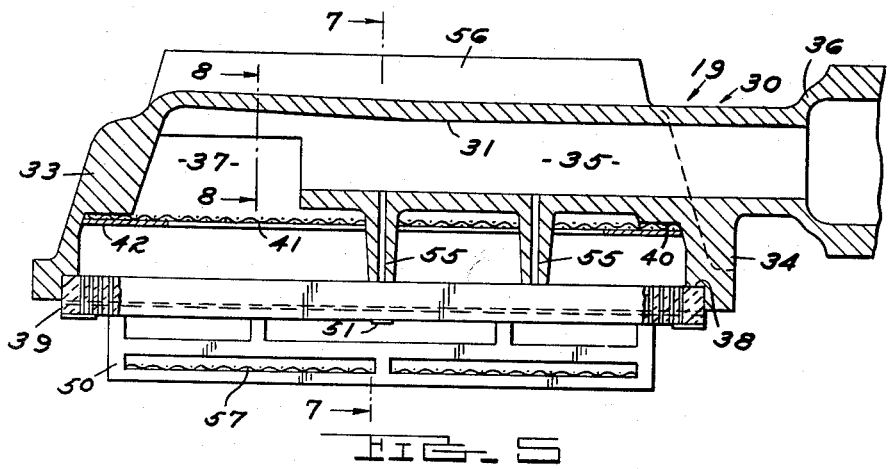
FIG. 5 is a sectional view taken along the line 5—5 in FIG. 4.

As shown in FIGS. 5 and 7, supporting members 50 are provided adjacent the sides of the side walls 32 and include bent tabs 51 that assist in supporting the burner elements. In addition, a screen 57 of substantially larger mesh than the screen 41 is supported between the members 50 to prevent foreign matter from contacting the burner elements 39. Screens 57 and 41 can be made of stainless steel.

In use, gas is introduced through nozzle 43 under the line pressure and is caused to aspirate air through the inlet 36 to the interior of the casing 30 and thereafter through the burner elements 39 where it is burned on the surface of the burner elements. The combustion gases pass through the staggered passages 24, 25 and upwardly between the end wall 15 and deflector 26 to the inlet 20 and out the stack 21. This causes a natural draft pulling cool air from the exterior through the inlet 16 across the casing 30 and out into intimate mixture with the combustible gases through the stack 21. This cools the exterior of the rayhead 19.

The extent of the draft is dependent upon the temperature of the combustion gases. Therefore, if the temperature of the gases is greater, as might be the case where the article being heated is nearer the burner element, the draft created will be greater and therefore a greater amount of air will be moved across the exterior of the rayhead 19 to cool it. Thus, the system is self-compensating. By cooling the exterior of the rayhead, the tendency for the interior of the rayhead to heat up and thereby cause backfiring is substantially eliminated.

By the above arrangement, the gases of combustion are entirely removed from the area of combustion and therefore there is no tendency for such gases to accumulate and adversely affect combustion, the area being heated, or the article being heated.

A continuous cooling of the casing insures that sufficient air will be provided to insure 100 percent combustion of the gases.

It has been found that any number of rayheads can be mounted in a single housing. In addition, the rayheads may be provided at any angle as long as the stack 21 is maintained at a relatively elevated position.

I claim:
1. An apparatus comprising a casing defining an enclosed chamber, said casing having an opening in a wall thereof, infrared burner means closing said wall, said casing having an inlet therein spaced from said wall through which a mixture of air and combustible gases may pass to said chamber and through said burner means for combustion on the exterior surface of said burner means, a housing surrounding said casing and having an opening in a wall thereof into which said casing is positioned and extends, the exterior surface of said burner means being exposed to the exterior of said housing, said housing having an inlet sufficiently removed from the exterior surface of said burner means so that cool air may be supplied to said casing and to the interior of said housing, said housing having an outlet, said housing inlet and outlet being positioned near opposite sides of said casing, and means within said housing for directing combustion gases from adjacent the burner means to said outlet in a manner to bypass said casing and in a manner to draw air from the exterior of said housing into said housing inlet and across the exterior surface of said casing to thereby cool said casing, the air drawn into said housing mixing with said combustion gases and passing out through the outlet of said housing.

2. An apparatus comprising a casing defining an enclosed chamber, said casing having an opening in a wall thereof, infrared burner means closing said wall, said casing having an inlet spaced from said wall through which a mixture of air and combustible gases may pass to said chamber and through said burner means for combustion on the exterior surface of said burner means, a housing surrounding said casing and having an opening in a wall thereof into which said casing is positioned with said burner means adjacent to said housing opening, the exterior surface of said burner means being exposed to the exterior of said housing, said housing having an inlet adjacent to said casing inlet through which air may be supplied to said casing and to the interior of said housing, said housing having an outlet, said housing inlet and outlet being positioned near opposite sides of said casing so that cool air entering said inlet passes over said casing before escaping out said outlet, and means within said housing for directing combustion gases from adjacent the burner means to said outlet in a manner to bypass said casing and in a manner to draw air from the exterior of said housing into said casing and across the exterior surface of said casing to thereby cool said casing, the air drawn into said housing mixing with said combustion gases and passing out through said outlet of said housing.

3. An apparatus comprising a casing defining an enclosed chamber, said casing having an opening in a wall thereof, infrared burner means closing said wall, said casing having an inlet spaced from said wall through which a mixture of air and combustible gases can be directed and pass to said chamber and through said burner means for combustion on the exterior surface of said burner means, a housing having a top, bottom, side and end walls surrounding said casing and having an opening in said bottom wall thereof, said casing being positioned within said housing with said burner means adjacent to said opening in the bottom wall of the housing, the exterior surface of said burner means being exposed to the exterior of said housing, said housing having an inlet substantially surrounding said casing inlet through which air may be supplied to said casing and to the interior of said housing, said housing having an outlet in a wall thereof, said housing inlet and outlet being positioned near opposite sides of said casing, and means within said housing for directing combustion gases from adjacent the burner means to said outlet in a manner to draw air from the exterior of said housing into said casing and across the exterior surface of said casing to thereby cool said casing, the air within said housing mixing with said combustion gases and passing out through said outlet of said housing.

4. An apparatus comprising a casing having fins on the exterior surface thereof and defining an enclosed chamber, said casing having an opening in a wall thereof, infrared burner means closing said wall, said casing having an inlet spaced from said wall through which a mixture of air and combustible gases can be directed and pass to said chamber and through said burner means for combustion on the exterior surface of said burner means, a housing surrounding said casing and having an opening in a wall thereof, said casing being positioned entirely within said housing with said burner means adjacent to said opening in the housing, the exterior surface of said burner means being exposed to the exterior of said housing, said housing having an inlet surrounding said casing inlet through which air may be supplied to said casing and to the interior of said housing, said housing having an outlet, said housing inlet and outlet being positioned near opposite sides of said casing, and means within said housing for directing combustion gases from adjacent the burner element to said outlet in a manner to draw air from the exterior of said housing into said casing and across the fins on the exterior surface of said casing to thereby cool said casing, the air within said housing mixing with said combustion gases and passing out through said outlet of said housing.

5. An apparatus comprising a casing defining an enclosed chamber, said casing having an opening in a wall thereof, infrared burner means closing said wall, a foraminous element interposed in spaced relation to the interior surface of said burner means, said casing having an inlet spaced from said wall through which a mixture of air and combustible gases can be directed and pass to said chamber and through said burner means for combustion on the exterior surface of said burner means, a housing surrounding said casing and having an opening in a wall thereof, said casing being positioned entirely within said housing with said burner means adjacent to said opening in the housing, the exterior surface of said burner means being exposed to the exterior of said housing, said housing having an inlet surrounding said casing inlet through which air may be supplied to said casing and to the interior of said housing, said housing having an outlet, said housing inlet and outlet being positioned near opposite sides of said casing, and means within said housing for directing combustion gases from adjacent the burner element to said outlet thereby drawing air from the exterior of said housing into said casing and across the exterior surface of said casing to thereby cool said casing, the air within said housing mixing with said combustion gases and passing out through said outlet of said housing.

6. An apparatus comprising a casing defining an enclosed chamber, said casing having a converging inlet, a nozzle positioned in said inlet into which combustion gases are supplied, said casing including an integral passage projecting from said casing inlet within the interior of said casing along a wall thereof and having an outlet nearer one wall than the other, said casing having an opening in a wall thereof, infrared burner means closing said wall, a mixture of air and combustible gases being directed to flow from said inlet and nozzle through said integral passage into said chamber and through said burner means for combustion on the exterior surface of said burner means, a housing surrounding said casing and having an opening in a wall thereof, said casing being positioned entirely within said housing with said burner means adjacent to said opening in the housing, the exterior surface of said burner means being exposed to the exterior of said housing, said housing having an inlet adjacent to said casing inlet through which air may be supplied to said casing and to the interior of said housing, said housing having an outlet, the housing inlet and outlet being positioned near opposite sides of said casing, and means within said housing for directing combustion gases from adjacent the burner element to said outlet in a manner to bypass said casing and in a manner to draw air from the exterior of said housing into said casing and across the exterior surface of said casing to thereby cool said casing, the air within said housing mixing with said combustion gases and passing out through said outlet of said housing.

7. The combination set forth in claim 6 including a peripheral flange projecting inwardly from said casing and spaced from the bottom wall for deflecting the combustible gases toward the center of the casing.

8. An apparatus comprising a casing having fins on the exterior surface thereof defining an enclosed chamber, said casing having an opening in a wall thereof, infrared burner means closing said wall, said casing having an inlet spaced from said wall through which a mixture of air and combustible gases can be directed and pass to said chamber and through said burner means for combustion on the exterior surface of said burner means, a housing surrounding said casing and having an opening in a wall thereof, said casing being positioned entirely within said housing with said burner means adjacent to said opening in the housing, the exterior surface of said burner means being exposed to the exterior of said housing, said housing having an inlet in a wall thereof isolated from the exterior of the burner means through which air may be supplied to said casing and to the interior of said housing, said inlet of said housing being positioned adjacent the inlet of said casing, said housing having on outlet, said housing inlet and outlet being positioned near opposite sides of said casing, and means within said housing for directing combustion gases from adjacent the burner element to said outlet thereby drawing air from the exterior of said housing into said casing and across the fins on the exterior surface of said casing to thereby cool said casing, said air mixing with said combustion gases and passing out through said outlet of said housing.

9. The combination set forth in claim 8 wherein said burner means is positioned in spaced relation to the opening in the wall of the housing.

10. An apparatus comprising flat burner means, a casing having a sidewall surrounding said burner means and a top wall spaced from said burner means so as to define an enclosed chamber behind one face of said burner means, said casing having an inlet means in said sidewall adapted to receive a mixture of air and combustible gases for delivering them into said chamber and out through said burner means for combustion on the exterior surface of the burner means, a housing having a sidewall surrounding the sidewall of said casing and a top wall spaced from the top wall of the casing for defining an enclosed chamber surrounding said casing, said housing having an inlet in the sidewall thereof through which cool air can be introduced into the interior of said housing, said housing having an outlet positioned adjacent to the side of the casing opposite to the housing inlet so that cool air from said inlet passes over said casing before passing out said outlet, and means within said housing for directing combustion gases from adjacent the exterior surface of said burner means to said housing outlet in a manner to bypass said casing and in a manner to draw air into said housing inlet across said casing and out said housing outlet for cooling said casing.

11. The invention as defined in claim 10 wherein said last-mentioned means comprises passage means extending between the sidewalls of said casing and housing adjacent to said housing outlet, one end of said passageway means communicating with the exterior of said housing at the exterior surface of said burner means in position to receive directly the combustion gases emitted therefrom, the other end of said passageway means communicating with the interior of said housing near said housing outlet in a manner to enable the combustion gases to mix with the cool air from said housing inlet just before passing out through said housing outlet.

12. The invention as defined in claim 10 wherein said housing inlet is positioned around said casing inlet to expose said casing inlet to a portion of the cool air being drawn into said housing inlet.

References Cited in the file of this patent

UNITED STATES PATENTS

| | | |
|---|---|---|
| 1,074,110 | Fyfe | Sept. 30, 1913 |
| 1,256,301 | Ellis | Feb. 12, 1918 |
| 1,313,196 | Lucke | Aug. 12, 1919 |
| 1,608,388 | Gritte | Nov. 23, 1926 |
| 2,051,213 | Hamilton | Aug. 18, 1936 |
| 2,081,657 | Balthis | May 25, 1937 |
| 2,775,294 | Schwank | Dec. 25, 1956 |

FOREIGN PATENTS

| | | |
|---|---|---|
| 192,780 | Great Britain | Feb. 9, 1923 |
| 305,786 | Great Britain | Feb. 14, 1929 |
| 842,596 | Great Britain | July 27, 1960 |
| 853,322 | France | Nov. 28, 1939 |
| 1,129,123 | France | Sept. 3, 1956 |
| 1,240,114 | France | July 25, 1960 |

JAMES W. WESTHAVER, *Primary Examiner.*

PERCY L. PATRICK, FREDERICK L. MATTESON, Jr., *Examiners.*